US012536924B2

(12) United States Patent
O'Brien et al.

(10) Patent No.: US 12,536,924 B2
(45) Date of Patent: Jan. 27, 2026

(54) FULL WRAP PRESSURE SENSITIVE LABEL

(71) Applicant: Anheuser-Busch, LLC, St. Louis, MO (US)

(72) Inventors: Terry O'Brien, Baldwinsville, NY (US); David Bunuan, Saint Johns, FL (US); Mark De La Rosa, Warners, NY (US); Al Morgan, St. Louis, MO (US); Michael Ferguson, Sodus, NY (US); Kevin O'Rourke, Liverpool, NY (US); Jason Peckham, Cato, NY (US)

(73) Assignee: Anheuser-Busch, LLC, St. Louis, MO (US)

( * ) Notice: Subject to any disclaimer, the term of this patent is extended or adjusted under 35 U.S.C. 154(b) by 421 days.

(21) Appl. No.: 18/010,802

(22) PCT Filed: Jun. 8, 2021

(86) PCT No.: PCT/US2021/036382

§ 371 (c)(1),
(2) Date: Dec. 15, 2022

(87) PCT Pub. No.: WO2021/257324

PCT Pub. Date: Dec. 23, 2021

(65) Prior Publication Data

US 2023/0215298 A1 Jul. 6, 2023

Related U.S. Application Data

(60) Provisional application No. 63/039,246, filed on Jun. 15, 2020.

(51) Int. Cl.

*G09F 3/10* (2006.01)
*G09F 3/02* (2006.01)

(52) U.S. Cl.

CPC .................. *G09F 3/10* (2013.01); *G09F 3/02* (2013.01); *G09F 2003/0241* (2013.01); *G09F 2003/0273* (2013.01)

(58) Field of Classification Search

CPC ...... G09F 3/10; G09F 3/02; G09F 2003/0241; G09F 2003/0273; G09F 2003/0251; B65C 3/163; B65C 3/18

See application file for complete search history.

(56) References Cited

U.S. PATENT DOCUMENTS 4,272,311 A 6/1981 D'Angelo et al.
4,793,891 A * 12/1988 Freeman .................. B65C 3/18 156/476

(Continued)

FOREIGN PATENT DOCUMENTS

CN 1351945 A 6/2002
JP 62271830 A 11/1987

(Continued)

OTHER PUBLICATIONS

International Search Report and Written Opinion received for PCT Application No. PCT/US2021/036382, mailed on Sep. 30, 2021, 10 pages.

(Continued)

*Primary Examiner* — Gary C Hoge
(74) *Attorney, Agent, or Firm* — Husch Blackwell LLP

(57) ABSTRACT

The present invention provides a novel adhesive arrangement that allows pressure sensitive labels to be fully wrapped around bottle necks using the center line transfer method. The pressure sensitive label includes an interior face including: an adhesive material; a border provided around the adhesive material where the label does not include the adhesive material; and a first margin at a first side (Continued)

edge of the interior face that does not include the adhesive material, the first margin being wider than the border.

15 Claims, 4 Drawing Sheets

(56) References Cited

U.S. PATENT DOCUMENTS 11,715,394 B1 * 8/2023 Kraft ..................... G09F 3/0288 40/633
2002/0056513 A1 * 5/2002 Tabuchi .................... B65C 9/20 156/267
2009/0031597 A1 2/2009 Powell et al.
2010/0181756 A1 * 7/2010 Viavattine ............ B42D 15/006 156/257
2011/0061802 A1 * 3/2011 Raming ................ G09F 3/0288 428/189
2012/0091023 A1 4/2012 Lotito
2016/0055773 A1 * 2/2016 Barry ........................ B65C 3/14 156/221
2025/0014482 A1 * 1/2025 Gamundi .................. G09F 3/10

FOREIGN PATENT DOCUMENTS

JP 2002099215 A 4/2002
JP 2002145228 A 5/2002
JP 3149744 U 4/2009
KR 1020140116414 A 10/2014
WO 2007/001483 A2 1/2007

OTHER PUBLICATIONS

International Preliminary Report on Patentability received for PCT Application No. PCT/US2021/036382, mailed on Dec. 29, 2022, 8 pages.

* cited by examiner

FULL WRAP PRESSURE SENSITIVE LABEL

CROSS-REFERENCE TO RELATED APPLICATIONS

This application claims priority to U.S. Provisional Patent Application Ser. No. 63/039,246, filed on Jun. 15, 2020, entitled "Full Wrap Pressure Sensitive Label," the entire disclosure of which is incorporated herein by reference.

FIELD OF THE INVENTION

The invention refers to a bottle label. More specifically, this invention refers to a full wrap bottle label design using an arrangement of adhesive on the label's back and a method for applying the same to a bottle.

BACKGROUND OF THE INVENTION

Alcoholic and non-alcoholic beverages alike are often bottled in "longneck-style" bottles. Those bottles are typically labeled at their bottle necks to indicate, for example, the brand of beverage, the beverage's ingredients, and the beverage's nutrition information. Some labels are only partially wrapped around a bottle neck's circumference, and other labels are wrapped completely around the bottle neck. The latter label-type are called "full wrap" labels. For full wrap labels, "cold glue" labels are used most often.

Cold glue labels require first applying an adhesive to the label in a first step before subsequently applying the label to a bottle. The label may be applied to the bottle using the efficient center line transfer method. The center line transfer method involves applying the label by first adhering it along a line at the center of the bottle neck before individually wrapping each side portion of the label around the bottle neck. Because cold glue labels require first applying glue to the label before applying the label to the bottle neck, applying cold glue labels can be time consuming. As such, the industry has shifted to applying "pressure sensitive labels" when possible in order to save time.

Pressure sensitive labels already include adhesive, thus cutting out one step in the process, as compared to the cold glue labels. Pressure sensitive labels only stick to bottles when enough pressure is applied. The degree of bond between the bottle and the label is influenced by the amount of pressure which is used to apply the adhesive to the bottle's surface. Unfortunately, bottle manufacturers have not figured out how to arrange adhesive on the back of a pressure sensitive label in such a way that allows it to be fully wrapped around a bottle neck's circumference using the efficient center line transfer method.

SUMMARY OF THE INVENTION

The present invention provides a novel adhesive arrangement that allows pressure sensitive labels to be fully wrapped around bottle necks using the center line transfer method. Each label has opposing first and second side edges, as well as a top side edge and a bottom side edge, and a front face (or "front") and a back face (or "back"). In some embodiments, the first side edge may be the left side edge when viewing the back of the label, and the second side edge may be the right side edge in the same orientation.

Adhesive is applied to the back of the label to create an adhesive arrangement having a pattern. The adhesive starts inward of the second side edge of the label's back and covers nearly the entire back surface. A small border is provided around the adhesive where the label does not include adhesive. The small border may be larger at the first side edge of the back of the label than at the second side edge, creating a wider margin that also does not include adhesive.

A material known in the industry as "deaden" is also provided on the rear of the label that partially overlaps with the adhesive. Deaden is used in the bottling industry to cover up portions of the label, including adhesive, so that when the label is applied to a bottle, bubbles and other imperfections created by the adhesive are muted by the deaden. Those bubbles and imperfections and thus preferably are not visible from inside the glass. The deaden in the label subject of the current application is provided as a strip of material adjacent the upper edge of the rear of the label covering a portion of the adhesive and a portion of the border of no adhesive. The deaden is applied almost entirely along the top edge of the label, but a margin on the second side edge of the label (including where adhesive is present) is provided without deaden.

To apply the improved label, a bottler may use the center line transfer method. More particularly, the bottle is spun at a constant speed so that the linear velocity of the neck of the bottle matches the linear velocity of the pressure sensitive label being expelled from an aggregate spender plate. The pressure sensitive label attaches itself to the neck of the bottle at the center of the label, known as center tack application.

This process uses a labeling machine that can spin individual bottles clockwise or counterclockwise at any speed. The machine uses individual servo motors that drive the plate upon which each bottle sits. The top (crown) of the bottle is held directly above the servo plate so that the bottle may be spun about its axis.

The bottle and label are spun in a first direction such that the left side of the label is wiped down against a pair of brushes that are located outside the diameter of the labeling machine. This is accomplished by spinning the bottle in the same direction as the machine. The brushes are positioned to wipe the label down without causing wrinkles.

Once the entire left side of the label is adhered to the bottle, the right side of the label may be wiped against a pair of brushes located inside the diameter of the machine. The right side is wiped down by spinning the bottle in the opposite direction the machine spins. Again, the brushes are positioned to wipe the label down without causing wrinkles.

Once the entire right side is wiped down, there is one final brush that ensures the overlapping edge of the label is adhered to the left edge of the label. The bottle is preferably positioned such that this final brush effectively wipes down this final edge.

BRIEF DESCRIPTION OF THE DRAWINGS

For a better understanding of the various embodiments of the present invention, reference may be made to the accompanying drawings in which.

Figure 1:
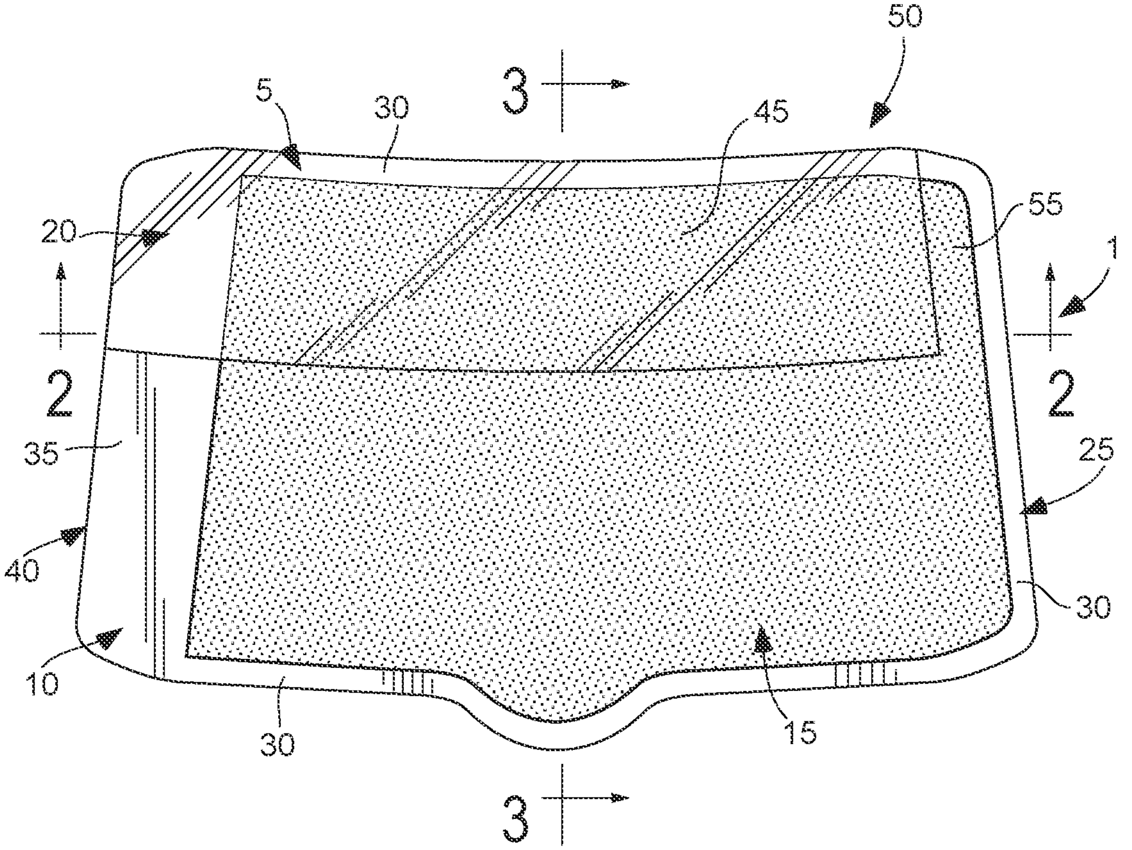
FIG. 1 is a plan view of a full wrap pressure sensitive label constructed according to the teachings of the present invention.

While the disclosure is susceptible to various modifications and alternative forms, specific embodiments thereof are shown by way of example in the drawing and will herein be described in detail. It should be understood, however, that the drawings and detailed description presented herein are not intended to limit the disclosure to the particular embodiment disclosed, but on the contrary, the intention is to cover all modifications, equivalents, and alternatives falling within the spirit and scope of the present disclosure.

DETAILED DESCRIPTION OF THE INVENTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures. It will be understood that any dimensions included in the figures are simply provided as examples and dimensions other than those provided therein are also within the scope of the invention.

The description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

Turning first to FIG. 1, a full wrap pressure sensitive label 1 is illustrated (hereinafter referred to simply as the "label 1"). More particularly, an interior (or "rear") side 5 of the label 1 is illustrated. The interior side 5 of the label 1 is the side of the label that would be in contact with a bottle's neck when the label 1 is applied using the method described below with respect to FIGS. 4-10. An exterior, or front side, of the label (illustrated in FIGS. 6 and 8) would include the information or features facing a customer that the beverage maker wants the consumer to see (e.g. product name, artwork, nutritional information).

A novel adhesive arrangement on the interior side 5 of the label 1 allows pressure sensitive labels to be fully wrapped around bottle necks using the center line transfer method. The adhesive arrangement includes two separate materials that are applied to paper 10 (or other foreseeable material) from which the label 1 is constructed: an adhesive material 15 and a "deaden" material 20. The adhesive material 15 is preferably pre-applied directly to the paper 10 on the interior side 5 of the label 1. The adhesive material 15 preferably starts near a second edge 25 (on the right side of the label 1) of the interior side 5 and covers nearly the entire interior side 5. Preferably, however, a small border 30 is provided around the adhesive material 15 where the paper 10 does not include the adhesive material 15. Further, a margin 35 may be provided near a first edge 40 (on the left side) on the interior side 5 of the label 1.

The deaden material 20 is also provided on the interior side 5 of the label 1. The deaden material 20 preferably partially overlaps with the adhesive material 15 at an overlap area 45. Deaden material 20 may cover up certain portions of the label 1 and its adhesive material 15. As such, when the label 1 is applied to a bottle in the manner described below, bubbles and other imperfections created by the adhesive material 15 are covered by the deaden material 20 and are not visible from within the bottle. The deaden material 20 in the novel adhesive arrangement is preferably provided along an upper or top edge 50 of the interior side 5 of the label 1. The deaden material 20 is located almost entirely along the upper edge 50 of the label, but a margin 55 near the second or right edge 25 of the label 1 (where adhesive material 15 is present) is preferably provided without the deaden material 20.

Figure 2:
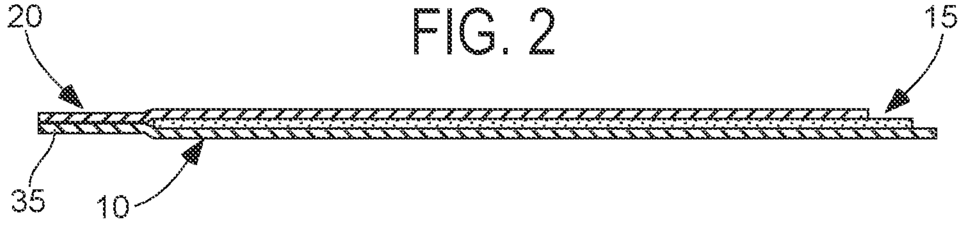
FIG. 2 is a cross-section view taken across line 2-2 of FIG. 1.
Figure 3:
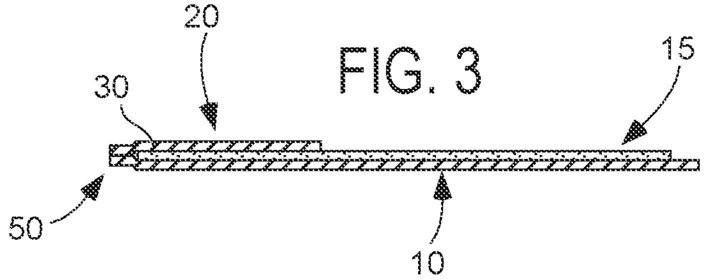
FIG. 3 is a cross-section view taken across line 3-3 of FIG. 1.
Figure 4:
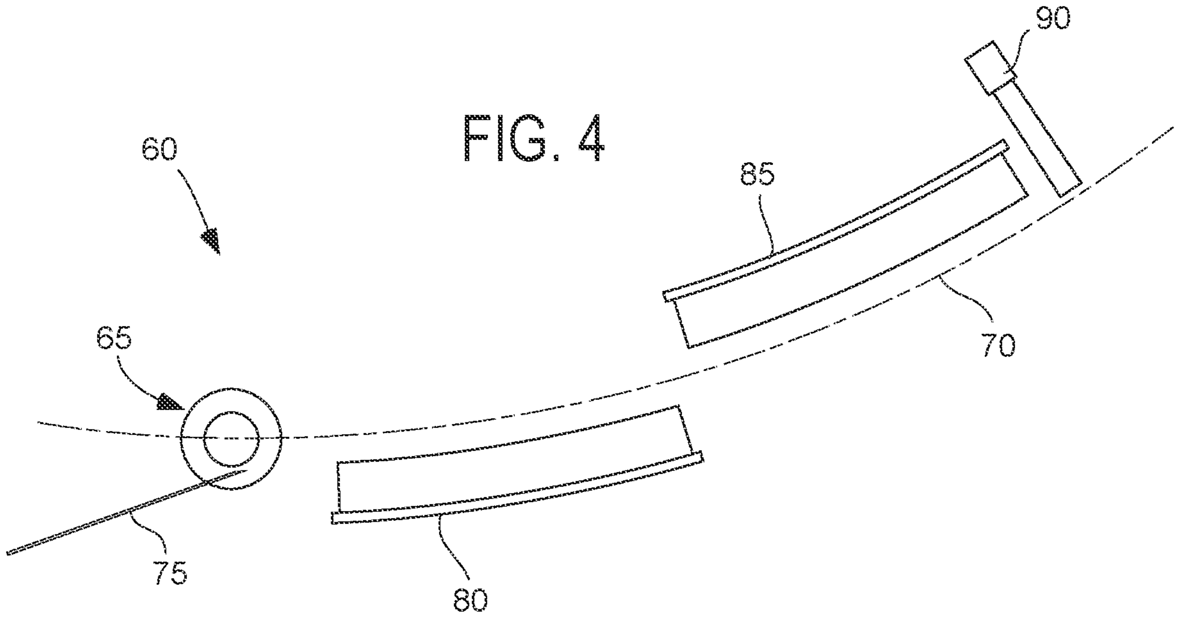
FIG. 4 is a schematic illustrating a first step in applying the label of FIG. 1.
Figure 5:
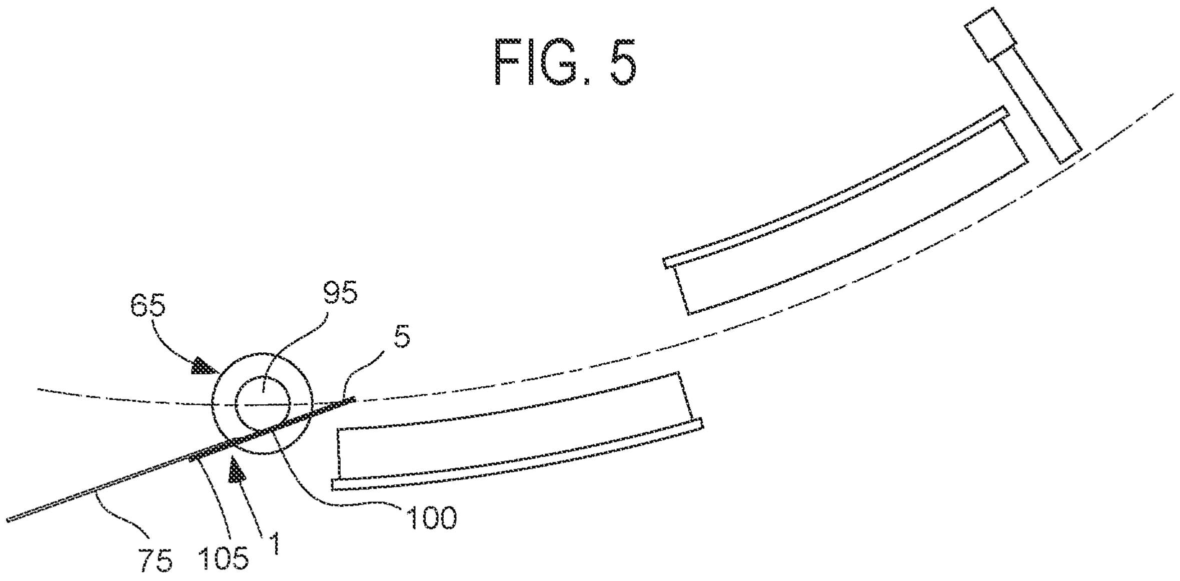
FIG. 5 is a schematic illustrating a second step in applying the label of FIG. 1.

FIG. 2 illustrates the label 1 and its various layers when a cross-section is taken across line 2-2 in FIG. 1, and FIG. 3 illustrates the same when a cross-section is taken across line 3-3. As provided in FIGS. 2 and 3, at the margin 35 and the portion of the border 30 at the top edge 50, respectively, the deaden material 20 preferably directly applied to the paper 10.

To apply the improved label 1 a bottle labeler or manufacturer may use the center line transfer method. FIGS. 4-10 illustrate an exemplary assembly 60 that may be used to apply a label to a bottle using the center line transfer method. As provided in FIG. 4, a bottle 65 is represented as traveling along a bottle path 70 in the assembly 60 when a label such as the label 1 is applied to a bottle such as the bottle 65. A spender plate 75 like those known and understood in the art may introduce a label such as the label 1 (not illustrated in FIG. 4) to the assembly 60 so that it may be applied to the bottle 65. A first outer brush 80, inner brush 85, and final brush 90 are preferably provided along the bottle path 70 to carry out the below-described processes.

When the bottle 65 is introduced to the assembly 1, it is preferably provided such that it is rotating at a constant velocity to match the linear velocity at which the label is introduced to the assembly 1. When this happens, as provide in FIG. 5, the interior side 5 of the label 1 may be applied to the bottle 65, and more particularly, a neck 95 of the bottle 65, at a center line 100 of the label 1 (center tack application).

The described method process uses an assembly 60 including a labeling machine that can spin individual bottles such as the bottle 65, in either of a clockwise or counterclockwise direction, at nearly any speed. Individual servo motors (not illustrated) preferably drive the plate (not illustrated) upon which each bottle sits. The top (crown) of each bottle such as the bottle 1 is held directly above the servo plate so that the bottle may be spun about its axis.

Figure 6:
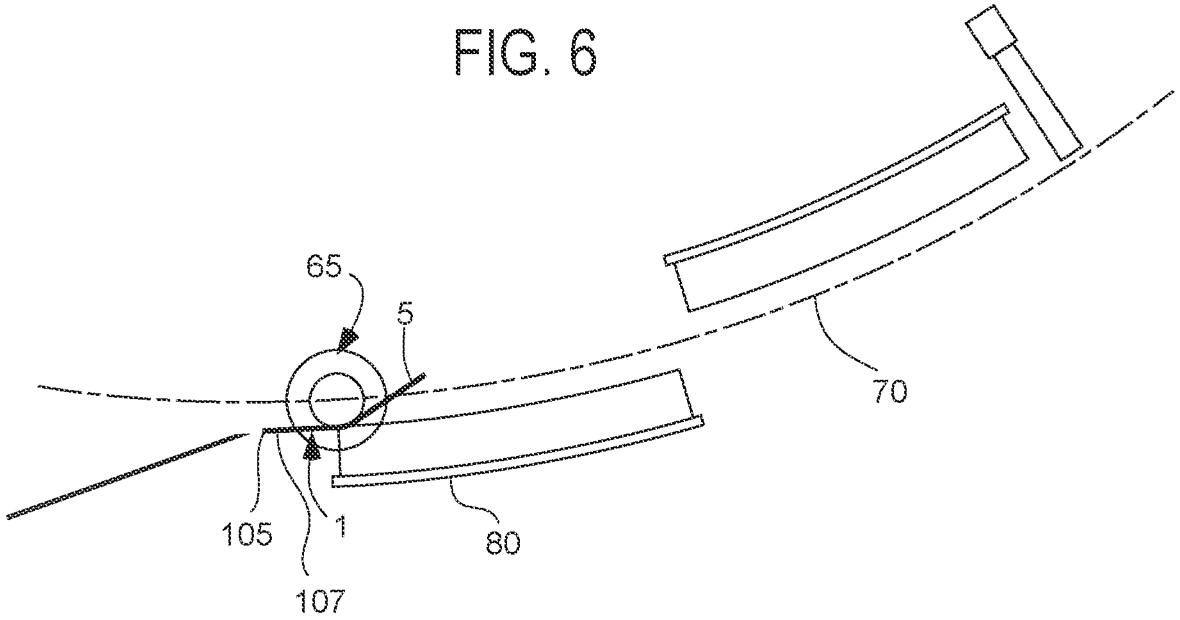
FIG. 6 is a schematic illustrating a third step in applying the label of FIG. 1.
Figure 7:
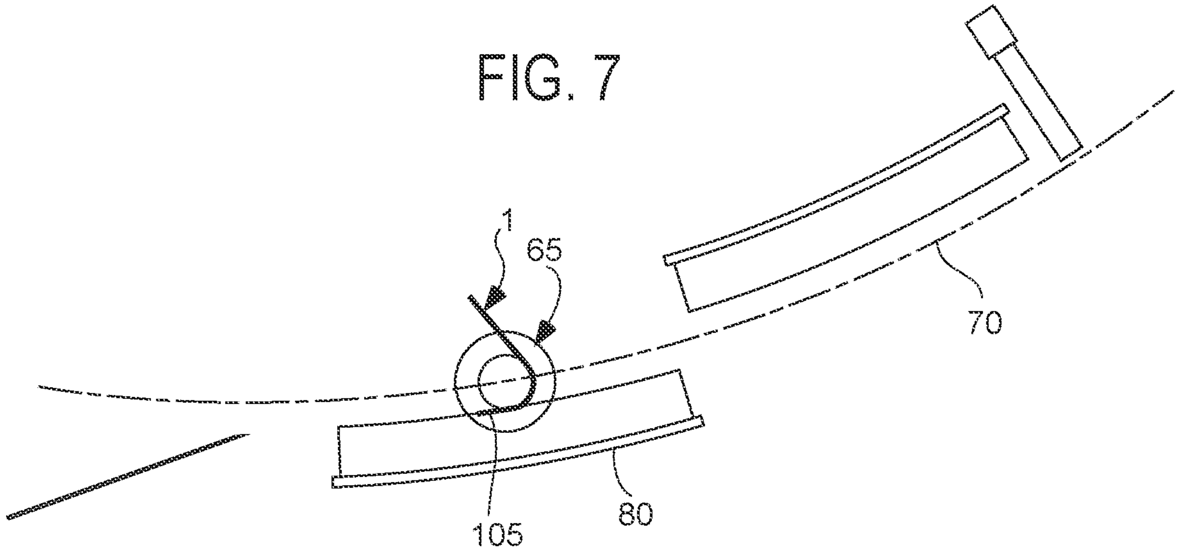
FIG. 7 is a schematic illustrating a fourth step in applying the label of FIG. 1.

As illustrated in FIGS. 6 and 7, the bottle 65 and the label 1 are spun in a first direction (preferably counterclockwise) such that a left side 105 of an exterior side 107 (and thus the second or right edge 25 of the interior side 5 of the label 1) of the label 1 is wiped down by the outer brush 80 (outside the diameter of the bottle path 70). In this way, right side of the interior side 5 of the label 1 is first pasted to the bottle 65. This is because, as described above substantially all of the right side of the interior side 5 of the label 1 (except at the border 30) includes adhesive material 15, including at the margin 55. Such adhesive material 15 helps initially secure the label 1 to the bottle 65. In alternative embodiments, multiple first brushes like the brush 80 may be provided.

Figure 8:
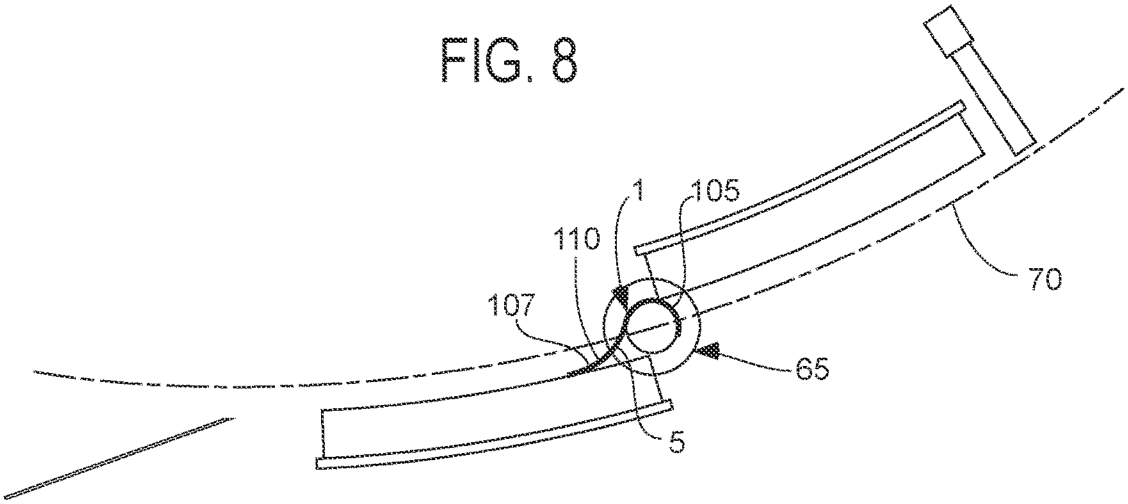
FIG. 8 is a schematic illustrating a fifth step in applying the label of FIG. 1.
Figure 9:
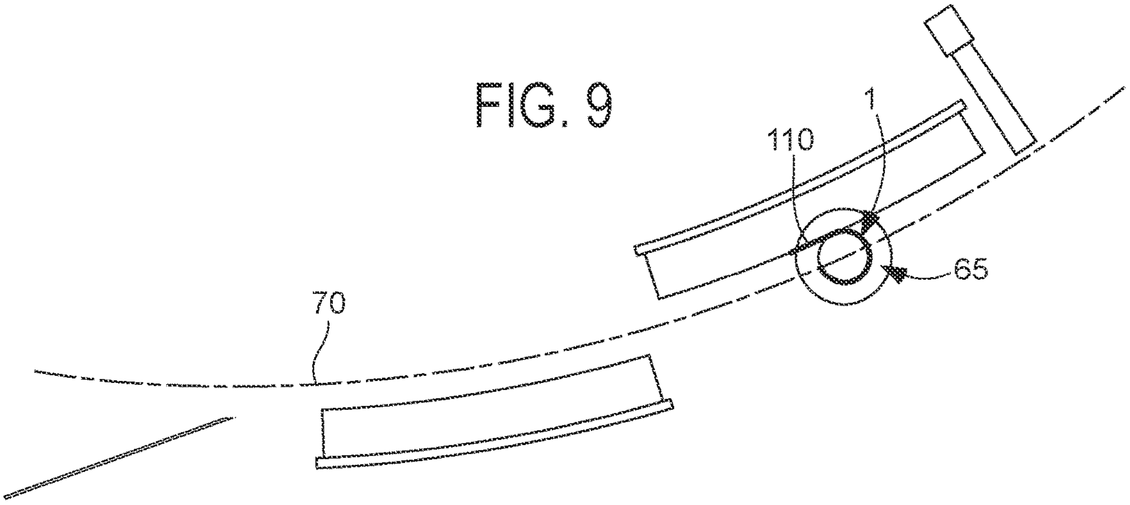
FIG. 9 is a schematic illustrating a sixth step in applying the label of FIG. 1.

Turning to FIGS. 8 and 9, once the entire left side 105 of the exterior side 107 of the label 1 is pasted to the bottle 65, the bottle 65 may begin spinning in an opposite direction (in the described embodiment, clockwise). A right side 110 of the exterior side 107 (the left side of the interior side 5) of the label 1 may be wiped against the inner brush 85 located inside the diameter of the bottle path 70 so that the right side 110 is pasted to the bottle 65. When this takes place, the left edge 40 preferably overlaps the right edge 25 by approximately the width of the margin 35, and the deaden layer 20 substantially forms an upper circumference of the label 1.

Figure 10:
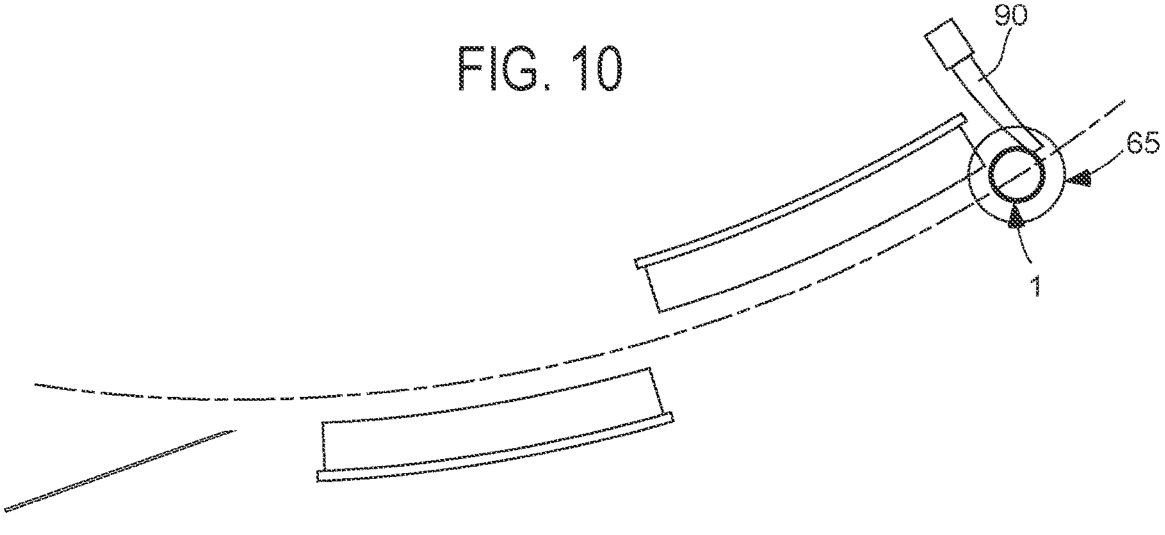
FIG. 10 is a schematic illustrating a seventh step in applying the label of FIG. 1.

As provided in FIG. 10, once the entire right side 110 is wiped down, the final brush 90 may ensure the overlapping edge of the label 65 overlaps and is adhered to the left edge 105 of the label 1. The bottle 65 should be positioned along the such that the final brush effectively wipes down this final edge.

It should be noted that the above described process could be carried out in an opposite manner. In other words, for example, the bottle 65 may first turn clockwise, and then counterclockwise.

From the foregoing, it will be seen that the various embodiments of the present invention are well adapted to attain all the objectives and advantages hereinabove set forth together with still other advantages which are obvious and which are inherent to the present structures. It will be understood that certain features and sub-combinations of the present embodiments are of utility and may be employed without reference to other features and sub-combinations. Since many possible embodiments of the present invention may be made without departing from the spirit and scope of the present invention, it is also to be understood that all disclosures herein set forth or illustrated in the accompanying drawings are to be interpreted as illustrative only and not limiting. The various constructions described above and illustrated in the drawings are presented by way of example only and are not intended to limit the concepts, principles and scope of the present invention.

Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A pressure sensitive label that may be applied to a bottle's neck, the label including:
- an interior face, the interior face including:
  - an adhesive material;
  - a border provided around the adhesive material where the label does not include the adhesive material; and
  - a first margin at a first side edge of the interior face that does not include the adhesive material, the first margin being wider than the border;
- wherein the interior face further includes a deaden material that at least partially overlaps with the adhesive material, the deaden material provided as a strip adjacent an upper edge of the interior face.

2. The label of claim 1, wherein the interior face further includes a second margin at a second side edge of the interior side that includes the adhesive material but not the deaden material.

3. The label of claim 2, wherein the second side edge is a right side edge.

4. The label of claim 1, wherein the first margin is between 0.3 and 0.6 inches wide.

5. The label of claim 1, wherein the first side edge is a left side edge.

6. The label of claim 1, wherein the pressure sensitive label is applied using the center line technique.

7. The label of claim 1, wherein the border is between 0.03 and 0.1 inches wide.

8. A pressure sensitive label that may be applied to a bottle's neck, the label including:
- an interior face, the interior face including:
  - an adhesive material covering a first portion of the label;
  - a border provided around the first portion of the label;
  - a first margin at a first side edge of the interior face to form a second portion;
  - a deaden material that at least partially overlaps with the first portion and the second portion, the deaden material provided as a strip adjacent an upper edge of the interior face; and
  - a second margin at a second edge of the interior face in the first portion.

9. The label of claim 8, wherein the first margin is between 0.3 and 0.6 inches wide.

10. The label of claim 8, wherein the first side edge is a left side edge.

11. The label of claim 8, wherein the second edge is a right side edge.

12. The label of claim 8, wherein the pressure sensitive label is applied using the center line technique.

13. The label of claim 8, wherein the border is between 0.03 and 0.1 inches wide.

14. The label of claim 8, wherein the first portion has a greater surface area than the second portion.

15. The label of claim 8, wherein the deaden material makes up a greater surface area than the second portion.

* * * * *